(12) United States Patent
Havik et al.

(10) Patent No.: US 12,161,130 B2
(45) Date of Patent: Dec. 10, 2024

(54) AUTOMATIC MEAT CUTTING APPARATUS

(71) Applicant: cJet B.V., Rotterdam (NL)

(72) Inventors: Sander Martijn Havik, Berkel en Rodenrijs (NL); Ruud Jacobus Wilhelmus Schatorjé, Amsterdam (NL)

(73) Assignee: cJet B.V., Rotterdam (NL)

( * ) Notice: Subject to any disclaimer, the term of this patent is extended or adjusted under 35 U.S.C. 154(b) by 676 days.

(21) Appl. No.: 16/630,014

(22) PCT Filed: Jul. 17, 2018

(86) PCT No.: PCT/NL2018/050495
§ 371 (c)(1),
(2) Date: Jan. 10, 2020

(87) PCT Pub. No.: WO2019/017780
PCT Pub. Date: Jan. 24, 2019

(65) Prior Publication Data
US 2020/0268001 A1 Aug. 27, 2020

(30) Foreign Application Priority Data
Jul. 20, 2017 (NL) .................................... 2019287

(51) Int. Cl.
*A22C 17/00* (2006.01)
*A47J 36/24* (2006.01)
*A47J 36/32* (2006.01)
*A47J 37/04* (2006.01)
*A47J 37/07* (2006.01)

(52) U.S. Cl.
CPC ...... *A22C 17/0033* (2013.01); *A22C 17/0066* (2013.01); *A22C 17/0086* (2013.01); *A47J 36/2405* (2013.01); *A47J 36/32* (2013.01); *A47J 37/043* (2013.01); *A47J 37/0745* (2013.01)

(58) Field of Classification Search
CPC ............ A22C 17/0033; A22C 17/0066; A22C 17/0086; A47J 36/2405; A47J 36/32; A47J 37/043; A47J 37/0745
See application file for complete search history.

(56) References Cited

U.S. PATENT DOCUMENTS

| 9,950,437 | B2 * | 4/2018 | Al Afandi | ................. A23L 5/00 |
| 2015/0135971 | A1 * | 5/2015 | Atalay | ................. A47J 37/043 99/421 V |
| 2016/0106112 | A1 * | 4/2016 | Dunivan | ............ A22C 17/0006 452/157 |

FOREIGN PATENT DOCUMENTS

| EP | 0153148 | * | 2/1985 | ............. A47J 37/04 |
| EP | 0 777 992 A1 | | 6/1997 | |

(Continued)

*Primary Examiner* — Nathaniel E Wiehe
*Assistant Examiner* — Keith Brian Assante
(74) *Attorney, Agent, or Firm* — Hoffmann & Baron, LLP

(57) ABSTRACT

An automatic meat cutting apparatus includes: a skewer holding system to hold a skewer with meat in a vertical position and to rotate the skewer about a vertical axis of rotation, a grill unit to grill meat on the skewer, a meat cutting device to cut meat from the skewer, and an actuator system to move the cutting device with respect to the skewer. The automatic meat cutting apparatus further includes: a sensor device arranged to provide a sensor signal representative for a location of the meat on the skewer, and a processing unit to control the actuator system to move the cutting device to a desired cutting position on the basis of the sensor signal.

21 Claims, 6 Drawing Sheets

(56) References Cited

FOREIGN PATENT DOCUMENTS

EP 2 412 283 A1 2/2012
WO 2009/085022 A1 7/2009

* cited by examiner

AUTOMATIC MEAT CUTTING APPARATUS

CROSS-REFERENCE TO RELATED APPLICATIONS

This application is the National Stage of International Application No. PCT/NL2018/050495, filed Jul. 17, 2018, which claims the benefit of Netherlands Application No. 2019287, filed Jul. 20, 2017, the contents of which is incorporated by reference herein.

FIELD OF THE INVENTION

Shawarma is an increasingly popular food in the world. Shawarma is meat placed on a vertical positioned skewer that is rotated in front of a grill unit about a vertical axis of rotation. When the meat is prepared, the meat may be cut of the skewer in slices or parts. This cut meat is served on a plate, or as a sandwich or wrap. Shawarma may also be referred to as doner kebab or gyros, or similar meat dishes.

The present invention relates to an automatic cutting apparatus for cutting meat, in particular shawarma, doner kebab or gyros, from a vertically positioned skewer on which the meat is arranged. With this food becoming more popular there is a desire to further improve the meat cutting apparatus presently on the market.

SUMMARY OF THE INVENTION

It is therefore an aim of the invention to provide an improved meat cutting apparatus for cutting meats, such as shawarma, doner kebab or gyros. A further object of the invention is to provide a method to automatically cut meat from a skewer rotatable about a vertical axis of rotation using a cutting device.

The present invention provides an automatic meat cutting apparatus, comprising:
a skewer holding system to hold a skewer with meat in a vertical position and to rotate the skewer about a vertical axis of rotation,
a grill unit to grill meat on the skewer,
a meat cutting device to cut meat from the skewer, and
an actuator system to move the cutting device with respect to the skewer,
characterized in that the automatic meat cutting apparatus comprises:
a sensor device arranged to provide a sensor signal representative for a location of the meat on the skewer, and
a processing unit to control the actuator system to move the cutting device to a desired cutting position on the basis of the sensor signal.

The meat cutting apparatus provides automatic cutting of meat arranged on a skewer. The processing unit is configured to control the actuator system, such that the cutting device is moved by the actuator system to a desired cutting location where meat can be cut from the skewer.

The processing unit may also be arranged to control the rotation of the skewer held by the skewer holding system, for example by control of a rotation motor of the skewer holding system. Typically, the skewer will be rotated during grilling of the meat on the skewer, and will stand still when meat is cut from the skewer.

In an embodiment, the sensor device is configured to provide a sensor signal representative for a distance between the sensor device and a meat surface of meat on the skewer. By determining the distance between the sensor device and a meat surface of meat on the skewer, the location of the meat surface can be determined. The knowledge on the location of the meat surface can be used to cut the meat at a desired position.

The sensor device is preferably an optical sensor that uses an optical signal, for example a light beam, to determine the distance between the sensor device and the meat surface. The sensor device may for example use a triangulation or time of flight principle.

In an embodiment, the meat cutting apparatus comprises a cutting unit comprising the sensor device and the cutting device. By mounting the sensor device in the cutting unit, the sensor device may be shielded from direct radiation of the grill unit as the skewer with meat is arranged between the cutting unit and the grill unit.

In an embodiment, the processing unit is arranged to determine a distance between the meat surface on the skewer and the vertical axis of rotation on the basis of the sensor signal. By determining the distance between the meat surface on the skewer and the vertical axis of rotation, knowledge with respect to the location of the meat surface and the thickness of the meat may be obtained. This knowledge can be used in the control of the actuator system to move the cutting device to a desired location to cut meat from the skewer.

In an embodiment, the processing unit is arranged to determine a vertical meat surface profile of meat on the skewer on the basis of the sensor signal. On the basis of the distance between the meat surface on the skewer and the vertical axis of rotation of the skewer, along the height of the meat surface, a vertical meat surface profile can be determined.

On the basis of this vertical meat surface profile, the processing unit can be arranged to determine a cutting profile, and to control the actuator system to move the cutting device along the cutting profile to cut meat from the skewer as calculated by the processing unit.

The cutting profile may for example be determined to cut the meat surface in one or more vertical cuts to a desired vertical meat surface profile. It may for example be desired that the shape of the meat on the skewer is cylindrical such that all meat is arranged at the same distance from the grill unit. The cutting profile may also be determined to cut the shape of the meat to a frusto-conical shape, or any other desired shape. In another embodiment, the cutting profile may be calculated to follow the existing vertical meat surface profile to obtain slices or parts of meat of equal thickness and/or width over the height of the meat on the skewer.

In an embodiment, the processing unit is arranged to determine a circumferential meat surface profile of meat on the skewer. Normally, the meat will be cut in a downwards movement while the skewer is not rotated. After each vertical cut, the skewer may be rotated over an angular distance to align a different part of the meat surface with the cutting unit. For each of these vertical cuts, first a vertical meat surface profile may be obtained. When multiple vertical meat surface profiles distributed over the circumference of the skewer are determined, the vertical meat surface profiles can also be used to determine a circumferential meat surface profile, or even a complete 3D meat surface model.

Alternatively, the sensor device may be activated during rotation of the skewer, for instance when the meat on the skewer is grilled to determine the circumferential meat surface profile.

On the basis of the circumferential meat surface profile, the processing unit may be arranged to determine cutting profiles on the basis of the circumferential meat surface profile. The cutting profiles may for instance be calculated with the aim to eliminate eccentricity in the meat on the skewer. Such eccentricity may be undesirable as this may result in an uneven grilling of the meat on the skewer.

The cutting profiles are determined to cut the meat surface in one or more vertical cuts to a desired circumferential meat surface profile. Since the meat cutting apparatus is typically designed to carry out vertical cuts of the meat, the desired circumferential shape will be obtained by calculating vertical cuts, for instance by cutting thicker slices at one side of the skewer compared to the other side of the skewer and/or by making more vertical cuts at one side of the skewer, for example vertical cuts with a larger overlap compared with the other side of the skewer.

In an embodiment, the processing unit is configured to control the actuator system to move the sensor device in an upwards movement along the meat surface to measure the distance between the sensor device and the meat surface, and wherein the processing unit is configured to control the actuator system to move the cutting device in a downwards movement along the meat surface to cut meat from the skewer with meat.

Since meat that will be cut from the skewer will fall downwards, it is desirable that the vertical cut is performed in a downwards movement. The upwards movement of the cutting unit can then efficiently be used to measure the distance between the sensor device and the meat surface along the height of the meat on the skewer so that the processing unit can use the sensor signals to determine a vertical meat surface profile of the meat on the skewer.

In an embodiment, the skewer is rotated over an angular distance between each vertical cut of meat, wherein the angular distance is dependent on the distance between the meat surface on the skewer and the vertical axis of rotation. Since the processing unit may have knowledge on the distance between the meat surface and the vertical axis of rotation of the skewer and on the cutting width of the cutting device, the processing unit may also calculate the angular distance that the skewer needs to rotate to obtain two adjacent vertical cuts with a predetermined overlap or distance between the vertical cuts. Typically, the angular distance between two adjacent cuts will increase with decreasing distance between the meat surface and the axis of rotation of the skewer.

In an embodiment, the automatic meat cutting apparatus comprises a recipe selection device connected to the processing unit allowing the user to select a meat preparation recipe, wherein the processing unit is configured to:
adjust settings of the automatic meat cutting apparatus to grill and/or cut the meat according to the selected recipe, and/or
indicate manual settings of the automatic meat cutting apparatus to an operator for manual adjustment to grill and/or cut the meat according to the selected recipe.

It may be desirable that the meat cutting apparatus is optimized for preparing a desired meat or dish. The recipe selection device allows the operator to select the desired meat preparation recipe so that the meat cutting apparatus can be efficiently used for different recipes. On the basis of the selected recipe, the meat cutting apparatus will automatically adjust the settings that can automatically adjusted, and/or will suggest the operator to adjust manually some settings that cannot be automatically adjusted.

Settings that can be manually or automatically adjusted for preparation of a desired recipe may include grill unit temperature, distance from grill unit to meat surface, rotation speed of the skewer, cutting speed in vertical direction, cutting depth, cutting pressure, rotational speed of cutting knife, etc.

In an embodiment, the actuator system and/or the cutting device are arranged to carry out, when desired, a shaking movement with the cutting device and/or the cutting knife, respectively, to shake off any meat from the cutting device and the cutting knife. This shaking movement can be used to clean the cutting device and/or cutting knife after cutting of meat In an embodiment, the a skewer holding system comprises a top skewer holder for holding a top end of the skewer, wherein the top skewer holder is movable in vertical direction between a holding position and a placement position. Preferably, the top skewer holder is biased by a spring element into the placement position, wherein the top skewer holder comprises a bayonet like lock to lock the top skewer holder in the holding position.

In an embodiment, the automatic meat cutting apparatus comprises an integrated meat warmer for cut meat mounted below the cutting device and comprising:
a tray to hold a fluid in particular water,
a heater to heat fluid in the tray, and
a removable perforated plate arranged on the tray to receive meat cut from the skewer.

In an embodiment, the skewer holding system comprises a bottom skewer holder for holding a bottom end of the skewer, wherein the meat cutting apparatus comprises a skewer guide element to guide the bottom end of the skewer to the bottom skewer holder. The skewer with meat may be relatively heavy, for example over 100 kg. Sometimes, a lifting device is provided to place the skewer in the skewer holding system. However, often heavy skewers are manually placed in the skewer holding system. To facilitate placement of the skewer in the bottom skewer holder, a skewer guide element may be provided that allows the operator to slide the bottom end of the skewer through the skewer guide element to the bottom skewer holder of the skewer holding system.

The skewer guide element may be removably arranged on the automatic meat cutting apparatus so that it can be removed after the skewer has been arranged in the meat cutting apparatus and it does not hinder operation of the meat cutting apparatus.

The invention further provides a method to automatically cut meat from a skewer rotatable about a vertical axis of rotation using a cutting device, comprising the steps: measuring with a sensor device a distance between the sensor device and a meat surface of meat on the skewer,
determining with a processing unit a vertical meat surface profile of meat on the skewer on the basis of the measured distance, and
determining a cutting profile on the basis of the vertical meat surface profile, and move the cutting device along the cutting profile.

In an embodiment, the method comprises determining the cutting profile in order to cut the meat surface in one or more vertical cuts to a desired vertical meat surface profile.

In an embodiment, the method comprises the steps of:
determining with a processing unit a circumferential meat surface profile of meat on the skewer, and
determining the cutting profiles in order to cut the meat surface in one or more vertical cuts to a desired circumferential meat surface profile.

In an embodiment, the method comprises the step of rotating the skewer between each vertical cut over an angular distance, wherein the angular distance is dependent on the distance between the meat surface on the skewer and the vertical axis of rotation.

In an embodiment, the method comprises the steps of:
determining a meat preparation recipe selected by an operator in a recipe selection device,
automatically adjusting settings of the automatic meat cutting apparatus to grill and cut the meat according to the selected recipe, and/or
indicate to the operator manual settings of the automatic meat cutting apparatus to for manual adjustment to grill and cut the meat according to the selected recipe.

BRIEF DESCRIPTION OF THE DRAWINGS

An embodiment of an automatic meat cutting apparatus according to the invention will now be described in further detail, by way of example only, with reference to the accompanying drawings, in which.

DETAILED DESCRIPTION OF THE INVENTION

Figure 1:
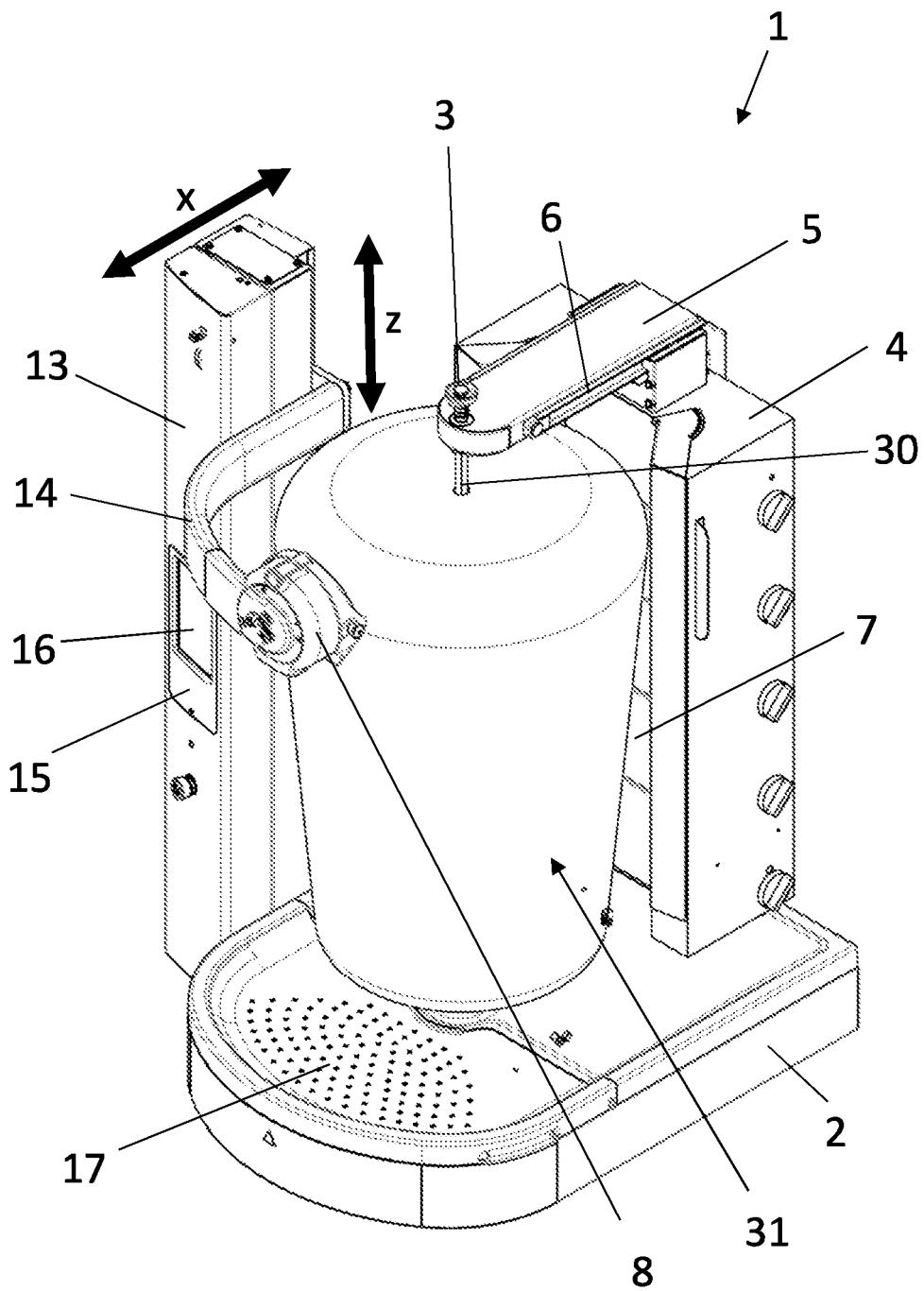
FIG. 1 shows an isometric view of an embodiment of an automatic meat cutting apparatus according to the invention.
Figure 2:
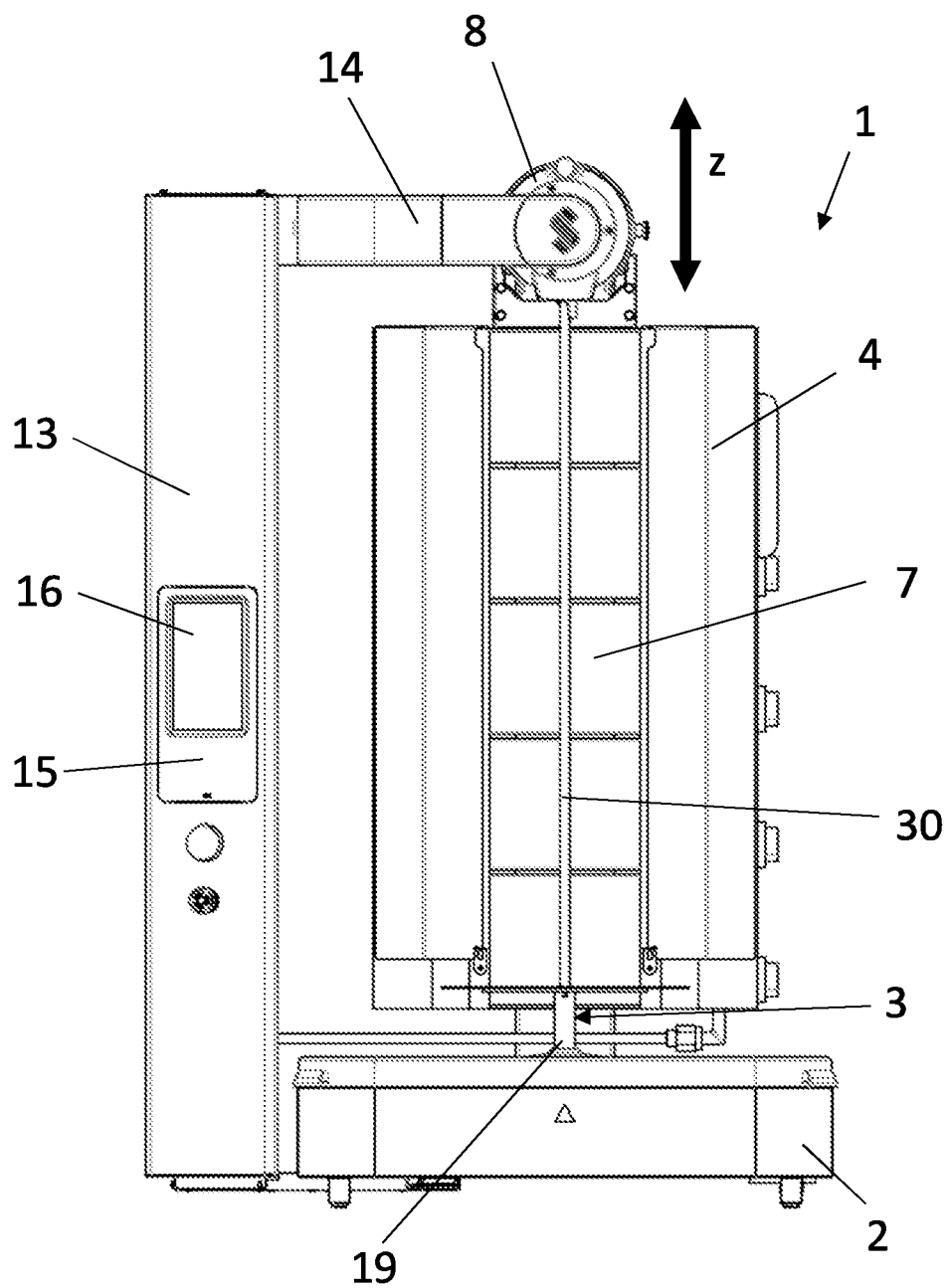
FIG. 2 shows a front view of the apparatus of FIG. 1.

FIG. 1 shows an isometric view of an automatic meat cutting apparatus, generally indicated by reference numeral 1. The meat cutting apparatus 1 comprises a base 2 and a skewer holding system 3 to hold a skewer 30 with meat in a vertical position and to rotate, when desired, the skewer 30 about a vertical axis of rotation. FIG. 2 shows a front view of the meat cutting apparatus 1.

A grill unit 4 is provided to grill meat arranged on the skewer 30. The grill unit 4 hangs from a grill unit support device 5 having linear guides 6 along which the grill unit 4 can be moved in order to adjust the distance between the meat surface of the meat on the skewer 30 and the grill elements of the grill unit 4. The supporting structure of the grill unit support device 5 is also used to mount the upper parts of the skewer holding system 3 that are arranged to hold the top end of the skewer 30.

The advantage of the hanging grill unit 4 is that the space below the grill unit 4 is free of support elements between the base 2 and the lower side of the grill unit 4. This free space facilitates cleaning of the meat cutting apparatus 1.

The grill unit 4 comprises a number of grill elements 7 which may be gas burners, or electric heating elements, or other elements to grill the meat on the skewer 30.

Figure 3:
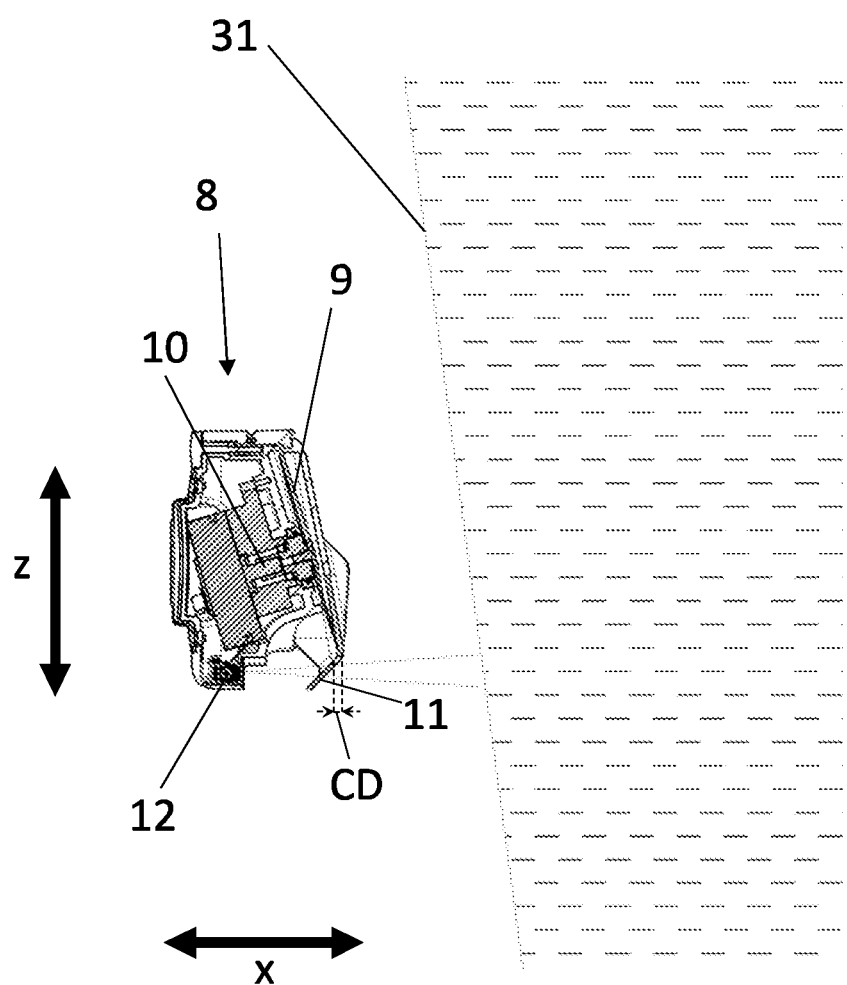
FIG. 3 shows schematically a cross section of the cutting unit next to a skewer with meat.

To cut meat from the skewer 30, the meat cutting apparatus 1 comprises a cutting unit 8. FIG. 3 shows a cross section of the cutting unit 8. The cutting unit 8 comprises a circular cutting knife 9 that can be driven in a rotating movement by a motor 10 provided in the cutting unit 8. The cutting unit 8 further comprises a readily removable pressure plate 11 that facilitates cutting of meat from the skewer 30.

The cutting unit 8 comprises a manual thickness adjuster for adjusting a cutting depth CD, i.e. the extent in which the bottom of the cutting knife 9 extends beyond the pressure plate 11. The cutting depth CD between the cutting knife 9 and the pressure plate 11 is a measure for the thickness of slices or parts that are cut from the meat. In an alternative embodiment the thickness adjuster may automatically be controlled by the meat cutting apparatus 1. It is remarked that the thickness of cut meat may also depend from other factors such as pressure with which the cutting unit 8 is pressed against the meat, and the type of meat.

The cutting unit 8 further comprises a sensor device 12 configured to provide a sensor signal representative for a distance between the sensor device and a meat surface of meat on the skewer. The sensor device 12 is an optical sensor that may use any sensor technique to determine a distance between the sensor and a meat surface of a meat on the skewer 30, such as triangulation or time of flight. The sensor device 12 is advantageously arranged at the opposite side of the skewer 30 with respect to the grill unit 4 such that the skewer 30 shields the sensor device 12 from direct radiation of the grill elements 7. Further, the sensor device 12 is at least partially shielded by the pressure plate 11.

An actuator system 13 is provided to move the cutting unit 4 with respect to the skewer 30. The cutting unit 8 is supported by the actuator system 13 via a support arm 14.

The actuator system 13 comprises a first linear actuator to move the support arm 14 and therewith cutting unit 8 in a vertical z-direction, indicated by a first double headed arrow. A second linear actuator is provided to move the cutting unit 8 in a horizontal x-direction, perpendicular to the axis of rotation of the skewer 30, indicated by a second double headed arrow.

It is remarked that, when electricity fails, the actuator system 13 is constructed such that the support arm 14 and the cutting unit 8 may be manually moved to a top position, and locked in this position, such that cutting of the meat may be performed manually without the presence of the support arm 14 and cutting unit 8 hindering the operator.

A processing unit 15 is provided to control the actuator system 13 to move the cutting unit 8 to a desired position. The processing unit 15 comprises a touch screen 16 to operate the meat cutting apparatus 1.

When meat that is cut from the skewer 30 it falls on a perforated plate of an integrated meat warmer 17.

When a skewer 30 with meat is placed in the skewer holder system 3, the meat can be prepared by activating the grill unit 4 and arranging the grill unit 4 at a desired distance from the meat surface 31 of the skewer 30 by movement of the grill unit 4 along the linear guides 6. In the shown embodiment this distance is manually adjusted, but in an alternative embodiment the distance may also be controlled by a grill unit position actuator controlled by the processing unit 15.

Also the heat provided by the grill elements 7 of the grill unit 4 can be manually adjusted as known in the art. Alternatively or additionally, the heat provided by the grill unit 4 may be controlled by the processing unit 15. During grilling of the meat, the skewer will normally be rotated continuously by the skewer holding system 3.

Once the meat has been sufficiently grilled, the grilled meat can be cut from the skewer 30. The start of the meat cutting can be activated by an operator of the device, for example by pressing a virtual 'start cutting'-button on the touch screen 16 of the processing unit 15. It is possible that the amount of meat to be cut or the number of cuts are also entered into the processing unit 15. For example, the operator may select between a number of vertical cuts, a number of rounds of vertical cuts over the complete circumference of the meat on the skewer 30, or a certain cutting time.

The meat cutting will be performed by vertical cuts along the meat surface 31, while during each cut the skewer 30 will stand still. Between two subsequent vertical cuts the skewer 30 will be rotated over a desired angular distance.

Before the vertical cut, the cutting unit 8 will be moved in a vertical scanning movement in upwards direction along the meat surface 31, while the sensor device 12 is activated. During this upwards movement, the sensor device 12 will measure a distance between the meat surface 31 of the meat on the skewer 30. In combination with the position of the cutting unit 8 in x-direction and z-direction, the processing unit 15 can then determine on the basis of the measured distance between the sensor device 12 and the meat surface 31, for each height a distance between the meat surface 31 and the vertical axis of rotation of the skewer 30.

On the basis of the calculated distances a vertical meat surface profile can be determined by the processing unit 15. This vertical meat surface profile can be used to determine a cutting profile, i.e. a profile with which the cutting unit 8 is moved along the meat surface 31 when it is moved downwards along the meat surface 31. During this downwards movement the motor 10 is activated to drive the cutting knife 9 in a rotating movement to cut meat from the skewer 30. Thus, during the downwards movement the cutting unit 8 is activated to cut meat from the skewer. The meat that is cut from the skewer will fall down on the meat warmer 17, where it can be collected by an operator of the apparatus 1.

The meat surface 31 will often not be perfectly flat. This non-flatness will be measured by the sensor device 12 and will be present in the vertical meat surface profile. The information of this vertical meat surface profile can advantageously be used to cut the meat.

For example, when it is desired that the cut meat has the same thickness, the cutting profile can be calculated to follow the vertical meat surface profile to obtain slices or parts of substantially equal thickness. It is also possible that it is desirable to obtain a certain shape of the meat on the skewer 30. For example, when the vertical meat surface profile is convex, it may be desirable to determine a cutting profile that cuts, in one or more vertical cuts, the meat to obtain a flat meat surface. Thereby the vertical cuts can be determined to obtain a cylindrical meat shape such that a distance between the meat surface 31 and the grill elements 7 becomes equal over the height of the skewer 30. It will be clear that also other shapes of the skewer, such as frusto-conical, may be obtained by determining cutting profiles on the basis of the vertical meat profile of the meat on the skewer 30.

It is remarked that preferably the vertical cuts do not skip areas of the meat surface 31 as this may result in that these areas may be overcooked. The cutting profiles may for example use variations in thickness and/or width of the cut meat and/or overlap between two adjacent vertical cuts to obtain a certain shape of the meat on the skewer 30.

When the cutting profile is determined the cutting unit 8 can be moved to the top side of the meat on the skewer 30 to start the vertical cut. This top side of the meat on the skewer 30 can be found on the basis of the vertical meat surface profile. When positioned at the top side of the meat, the vertical cut of the meat can be carried out by following the cutting profile as provided by the processing unit 15. The processing unit 15 will control the actuator system 13 to move the cutting knife 9 along the meat surface while cutting the meat as determined in the cutting profile. Thus during the vertical cut the cutting unit is moved downwards in the z-direction, while the second linear actuator may continuously change the position of the cutting unit 8 in the horizontal x-direction to follow the cutting profile.

It is remarked that at the bottom side of the skewer an extension plate may be provided having a substantial diameter. The presence of this extension plate, and it size, can be entered into the processing unit 15 or recognised by the processing unit 15 such that the cutting profile can be adapted, when needed, for the presence of the extension plate.

When one vertical cut is finished, the skewer 30 may be rotated over an angular distance to align another part of the circumference of the meat surface 31 of the skewer 30 with the cutting unit 8. The angular distance over which the skewer 30 is rotated between two adjacent vertical cuts may also depend on the distance between the meat surface 31 and the vertical axis of rotation of the skewer 30. When this distance becomes smaller, it may be desirable that the angular distance over which the skewer 30 is rotated becomes larger since the cutting knife 9 will cover a larger part of the circumference of the meat surface 31.

When the skewer has been rotated over the desired angular distance, the sensor device 12 may again be moved in a vertically upwards direction along the meat surface 31 to measure a distance between the sensor device 12 and the meat surface 31. On the basis of the measured distances, the processing unit 15 may again determine a vertical meat surface profile that can be used as a basis for calculating a cutting profile for a vertical cut along the meat surface 31. Again this cutting profile may be optimized to obtain with one or more vertical cuts a desired shape of the meat on the skewer 30, but also to obtain slices or part with the same thickness.

This cutting process may be followed until the desired number of vertical cuts of meat are cut from the skewer 30. The cutting process may automatically stop when the requested number of cuts are made, or can be stopped manually by an operator. When no cutting takes place, the skewer 30 may again be rotated by the skewer holding system 3, and the grill unit 4 may be activated or remain activated to grill the meat on the skewer 30.

When the processing unit 15 has vertical meat surface profiles of a substantial part, preferably the complete circumference of the meat surface 31, the processing unit 15 may also determine a circumferential meat surface profile of meat on the skewer 30. On the basis of the circumferential meat surface profile the eccentricity of the meat on the skewer 30 may for example be determined. This eccentricity may be undesirable as this may result in an uneven grilling of the meat on the skewer 30. Therefore, the processing unit 15 may be arranged to determine cutting profiles on the basis of the circumferential meat surface profile. In particular, the cutting profiles may be calculated to cut the meat surface in one or more vertical cuts to a desired circumferential meat surface profile, for example to a cylindrical shape without eccentricity.

The touchscreen 16 of the processing unit 15 may function as a recipe selection device allowing the operator to select a desired meat preparation recipe. Different types of meat and types of dishes may require a different preparation by the meat cutting apparatus 1. For example, beef may need a different setting of the grill unit 4, such as different temperature or distance from the meat, and/or a different rotation speed of the skewer 30 than chicken or lamb. Also there may be a difference in the way the meat is prepared, such as juicy or crispy, and the way the meat is cut, such as thick or thin slices. All these different recipes may therefore need different settings of the meat cutting apparatus 1. Some of these settings may be automatically controlled by the processing unit 15, but other settings may be manual settings.

The meat cutting apparatus comprises the recipe selection device to assist the operator in preparing the different meats and dishes. The operator may select a certain recipe on the touchscreen 16, for example 'thin crispy beef', 'thick juicy beef' or 'thin juicy chicken'. On the basis of this selection, the processing unit 15 will automatically adjust the settings of the automatic meat cutting apparatus that are controlled by the processing unit. Further, the touch screen 16 may indicate manual settings of the automatic meat cutting apparatus to the operator for manual adjustment of the manually controlled settings.

The processing unit 15 may request the operator to confirm, on the touch screen 16, that the settings are adjusted as suggested by the processing unit 15, before the preparation of the meat is started. This may prevent that the operator inadvertently does not change the manual settings of the meat cutting apparatus 1 as suggested by the meat cutting apparatus 1.

Settings that can be manually or automatically adjusted for preparation of a desired recipe may include grill unit temperature, distance from grill unit to meat surface, rotation speed of the skewer, cutting speed in z-direction, cutting depth, cutting pressure, rotational speed of cutting knife, etc.

The recipes may be pre-programmed by the manufacturer, but may also be programmable by the operator of the meat cutting apparatus 1.

The processing unit 1 may also be programmed to make the operator to follow a predetermined order of steps to start-up the meat cutting apparatus 1. By making the operator to follow the predetermined order of steps, it is assured that all steps to start-up the apparatus 1 are made and that these steps are made in the right order. A similar procedure may be followed when the use of the meat cutting apparatus 1 is stopped, for example for cleaning.

It may be possible that after cutting of meat, there is still meat on the cutting unit 8, for example on the cutting knife 9, the pressure plate 11, or in the line of view of the optical sensor device 12. To make this meat fall down from the cutting unit 8, the actuator system 13 and/or the motor 10 of the cutting knife are arranged to carry out, when desired, a shaking movement, for instance a vibrating movement of the cutting unit 8 in the x-direction and/or z-direction induced by the actuator system 13 and/or a vibrating movement of the cutting knife 9 induced by the motor 10 to shake off any meat from the cutting unit 8.

This shaking movement may for example be carried out when a cutting process of vertical cuts is stopped, and/or after a certain number of vertical cuts are made.

The skewer holding system 3 comprises a top skewer holder 18 for holding a top end of the skewer 30 and a bottom skewer holder 19 for holding the bottom end of the skewer 30. Since the skewers with meat may weigh over 100 kg, for example 120-140 kg, it may be a challenging task to place the skewer 30 in the skewer holding system 3.

To facilitate placement of the skewer 30 into the skewer holder system 3 without the risk of damaging the top side of the base 2 of the meat cutting apparatus 1, a removable skewer guide element 20 may be provided that can be placed on top of the top side of the base 2.

Figure 4:
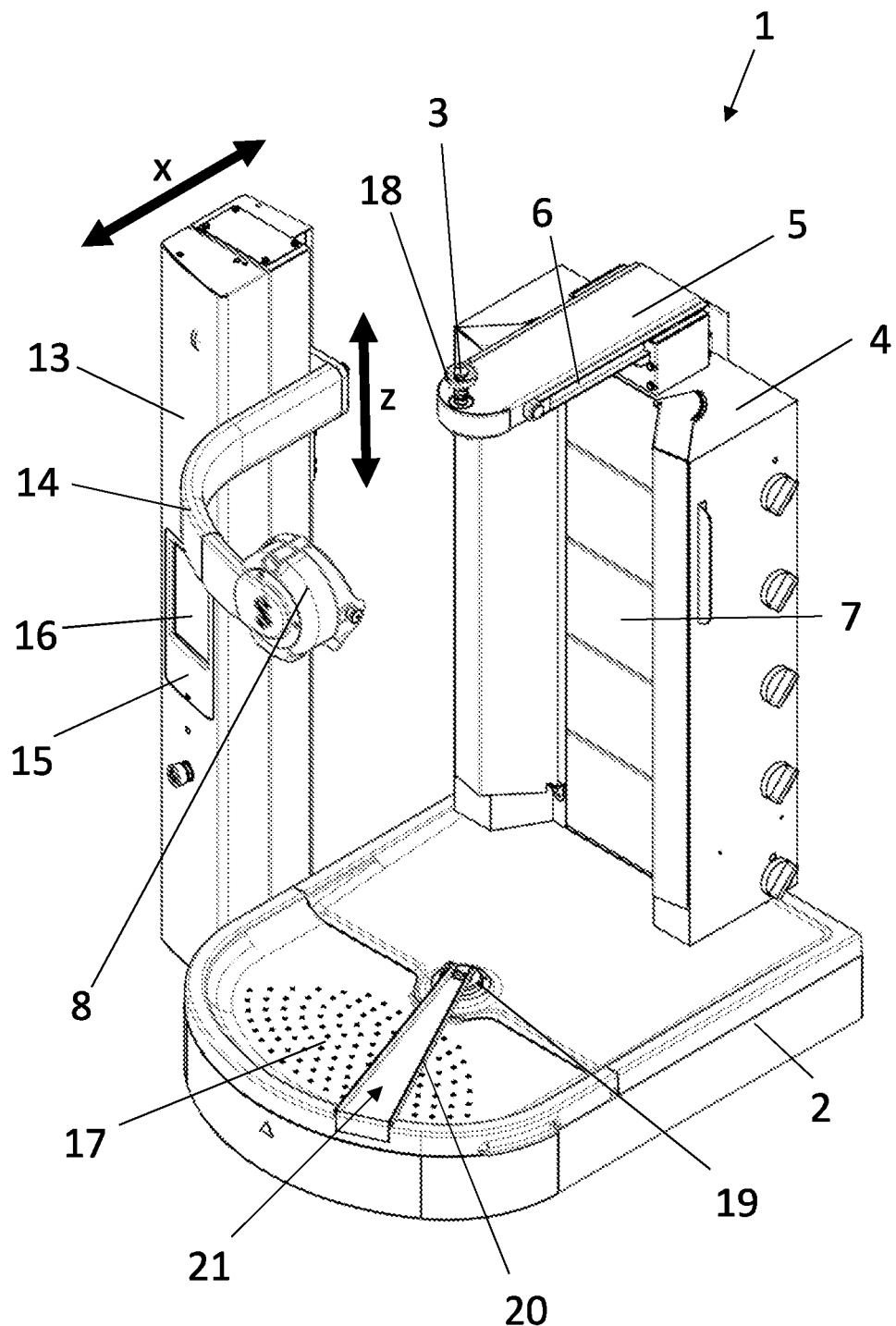
FIG. 4 shows an isometric view of the embodiment of FIG. 1 with a removable skewer guide element.

FIG. 4 shows the isometric view of FIG. 1, without the skewer 30 with meat. On the top side of the base 2, the removable guide element 20 is placed. The skewer guide element 20 is constructed to be supported at the ends of the skewer guide element 20, where it rests on the side wall of the base 2 and the support construction of the skewer holder system 3. When a skewer should be placed in the meat cutting apparatus 1, the bottom end of the skewer 30 may be placed in a guide channel 21 of the skewer guide element 20, for instance close to the side wall of the base 2. Once the bottom end of the skewer 30 is arranged in the guide channel 21, the skewer 30 can rest on the skewer guide element 20 without the risk of damaging the base 2, in particular its upper side. From this position, the bottom end of the skewer 30 may be pushed with a sliding movement towards and into the bottom skewer holder 19.

To further facilitate the positioning of the bottom end of the skewer 30 in the bottom skewer holder 19, the guide channel 2 narrows towards the bottom skewer holder 19.

When the bottom end of the skewer 30 is arranged in the bottom skewer holder 19, the top end of the skewer 30 can be brought towards the top skewer holder 18.

Figure 5:
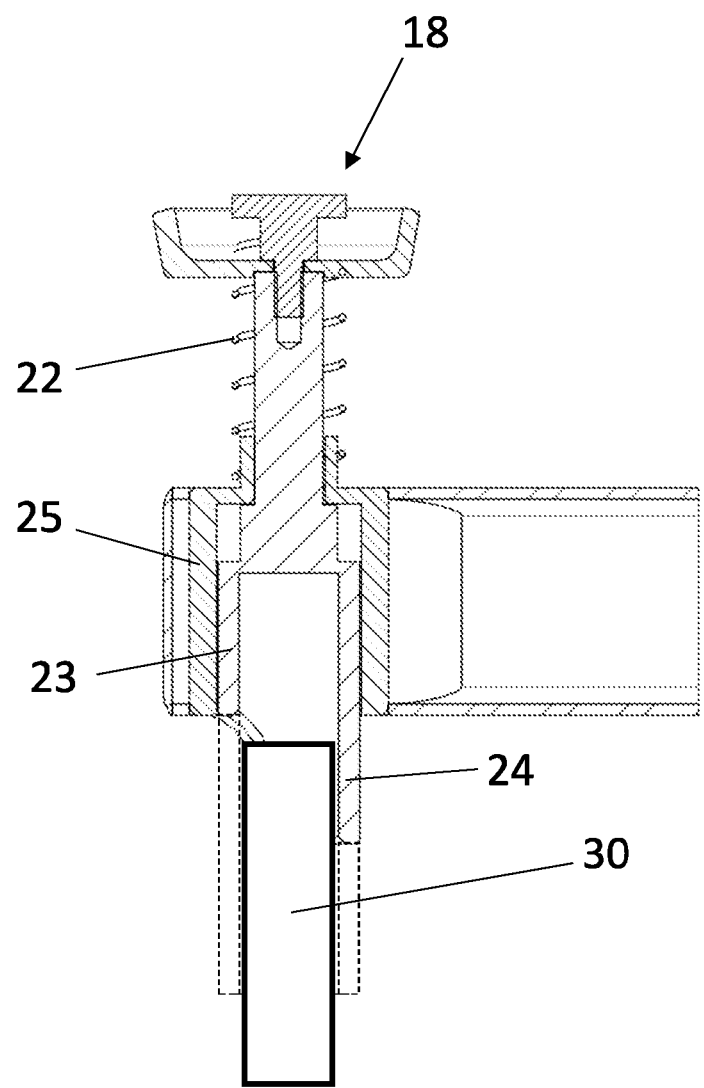
FIG. 5 shows a cross section of a top skewer holder of the apparatus of FIG. 1.

FIG. 5 shows a cross section of the top skewer holder 18. The top skewer holder 18 is movable between two positions, a placement position, as shown in FIG. 5, and a holding position, shown in ghost lines in FIG. 5. The top skewer holder 18 is biased by spring 22 in the placement position.

The top skewer holder 18 comprises a holding sleeve 23 having an extended lip 24. In the placement position the top end of the skewer 30 can be placed against the extended lip 24 to align the top end of the skewer 30 with the holding sleeve 23. When the top end of the skewer 30 is aligned with the holding sleeve 23, the top skewer holder 18 may be moved against the biasing force of the spring 22 to the holding position. In the holding position, the top skewer holder 18 can be rotated about its longitudinal axis with respect to a locking element 25 from an unlocked position into a locked position. In this locked position, the locking element 25 prevents that the top skewer holder 18 is moved by the biasing force of the spring or pressed by heated meat, that is expanded due to heating, to the placement position.

When the skewer 30 should be released from the top skewer holder 18, the top skewer holder 18 can be rotated back from the locked position into the unlocked position, in which the spring may press the top skewer holder 18 back to the placement position.

Figure 6:
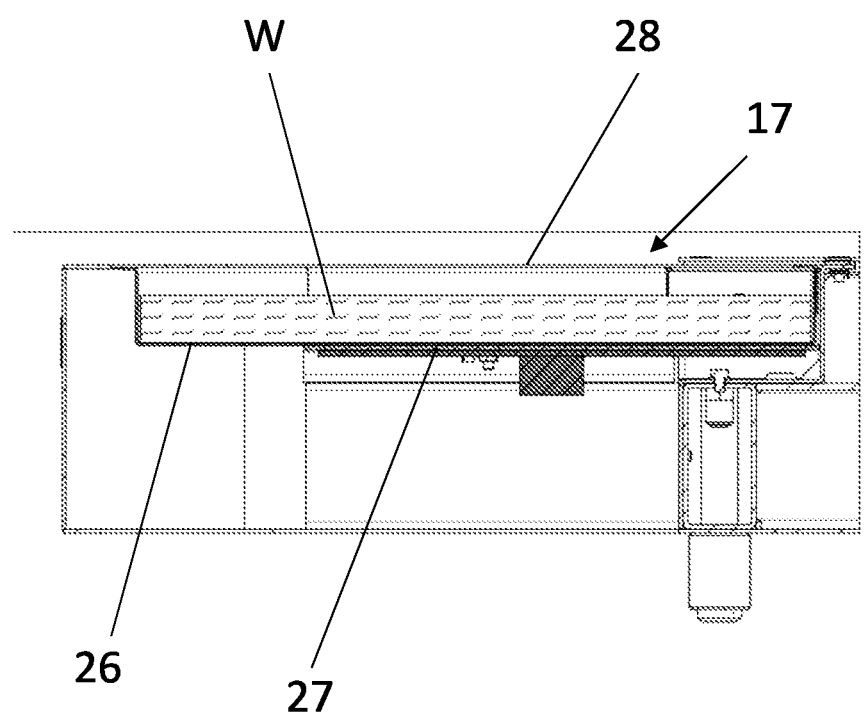
FIG. 6 shows a cross section of an integrated meat warmer.

FIG. 6 shows a cross section of the integrated meat warmer 17 for cut meat. The integrated meat warmer 17 is mounted in the base 2 below the cutting unit 8. The integrated meat warmer 17 comprises a tray 26 to hold a fluid, in particular water W, a heater 27 to heat the fluid in the tray 26, and a removable perforated plate 28 arranged on the tray 26 to receive meat which is cut from the skewer 30.

The heater 27 heats the water in the tray 26. Hot water damp will rise through the perforated plate 28 and will warm and humidify meat present on the perforated plate 28. Fat that will drip from the meat may flow through the perforated plate 28 and may be collected in the tray 26. The tray 26 is removable to discard the contents of the tray 26.

REFERENCE NUMERALS 1 meat cutting apparatus
2 base
3 skewer holding system
4 grill unit
5 grill unit support device
6 linear guides
7 grill elements
8 cutting unit
9 cutting knife
10 motor 11 pressure plate
12 sensor device
13 actuator system
14 support arm
15 processing unit
16 touch screen
17 meat warmer
18 top skewer holder
19 bottom skewer holder
20 skewer guide element
21 guide channel
22 spring
23 holding sleeve
24 extended lip
25 locking element
26 tray
27 heater
28 perforated plate
30 skewer
31 meat surface
CD cutting depth
W water

The invention claimed is:

1. An automatic meat cutting apparatus, comprising:
a skewer holding system to hold a skewer with meat in a vertical position and to rotate the skewer about a vertical axis of rotation,
a grill unit to grill meat on the skewer,
a meat cutting device to cut meat from the skewer,
an actuator system to move the cutting device with respect to the skewer,
a sensor device arranged to provide a sensor signal representative for a location of the meat on the skewer, and
a processing unit to control the actuator system to move the cutting device to a desired cutting position on the basis of the sensor signal,
wherein the processing unit is configured to determine multiple vertical meat surface profiles of meat on the skewer on the basis of the sensor signal,
wherein the processing unit is configured to determine a circumferential meat surface profile from the multiple meat surface profiles,
wherein the processing unit is configured to determine cutting profiles on the basis of the circumferential meat surface profile, and wherein the processing unit is configured to control the actuator system to move the cutting device along the cutting profiles, wherein the cutting profiles are determined to cut the meat surface in one or more vertical cuts to a desired circumferential meat surface profile.

2. The automatic meat cutting apparatus of claim 1, wherein the sensor device is configured to provide a sensor signal representative for a distance between the sensor device and a meat surface of meat on the skewer.

3. The automatic meat cutting apparatus of claim 1, wherein the meat cutting apparatus comprises a cutting unit comprising the sensor device and the cutting device.

4. The automatic meat cutting apparatus of claim 1, wherein the processing unit is arranged to determine a distance between the meat surface of the skewer and the vertical axis of rotation on the basis of the sensor signal.

5. The automatic meat cutting apparatus of claim 1, wherein the cutting profile is determined to cut the meat surface in one or more vertical cuts to a desired vertical meat surface profile.

6. The automatic meat cutting apparatus of claim 1, wherein the processing unit is configured to control the actuator system to move the sensor device in an upwards movement along the meat surface to measure the distance between the sensor device and the meat surface, and wherein the processing unit is configured to control the actuator system to move the cutting device in a downwards movement along the meat surface to cut meat from the skewer.

7. The automatic meat cutting apparatus of claim 4, wherein between each vertical cut of meat the skewer is rotated over an angular distance, wherein the angular distance is dependent on the distance between the meat surface on the skewer and the vertical axis of rotation.

8. The automatic meat cutting apparatus of claim 1, wherein the automatic meat cutting apparatus comprises a recipe selection device connected to the processing unit allowing the user to select a meat preparation recipe, wherein the processing unit is configured to:
adjust settings of the automatic meat cutting apparatus to grill and cut the meat according to the selected recipe, and/or
indicate manual settings of the automatic meat cutting apparatus to an operator for manual adjustment to grill and cut the meat according to the selected recipe.

9. The automatic meat cutting apparatus of claim 1, wherein the actuator system and/or the cutting device are arranged to carry out a shaking movement with the cutting device and/or the cutting knife, respectively, to shake off any meat from the cutting device and the cutting knife.

10. The automatic meat cutting apparatus of claim 1, wherein the a skewer holding system comprises a top skewer holder for holding a top end of the skewer, and wherein the top skewer holder is movable in vertical direction between a holding position and a placement position.

11. The automatic meat cutting apparatus of claim 10, wherein the top skewer holder is biased by a spring element into the placement position, and wherein the top skewer holder comprises a bayonet lock to lock the top skewer holder in the holding position.

12. The automatic meat cutting apparatus of claim 1, wherein the automatic meat cutting apparatus comprises an integrated meat warmer for cut meat mounted below the cutting device and comprising:
a tray to hold a fluid in particular water,
a heater to heat water in the tray, and
a removable perforated plate arranged on the tray to receive meat cut from the skewer.

13. The automatic meat cutting apparatus of claim 1, wherein the skewer holding system comprises a bottom skewer holder for holding a bottom end of the skewer, and wherein the meat cutting apparatus comprises a skewer guide element to guide the bottom end of the skewer to the bottom skewer holder.

14. The automatic meat cutting apparatus of claim 13, wherein the skewer guide element is removably arranged on the automatic meat cutting apparatus.

15. A method to automatically cut meat from a skewer rotatable about a vertical axis of rotation using a cutting device, comprising the steps:
measuring with a sensor device a distance between the sensor device and a meat surface of meat on the skewer,
determining with a processing unit a vertical meat surface profile of meat on the skewer on the basis of the measured distance,
determining a cutting profile on the basis of the vertical meat surface profile, and
moving the cutting device along the cutting profile.

16. The method of claim 15, further comprising determining the cutting profile in order to cut the meat surface in one or more vertical cuts to a desired vertical meat surface profile.

17. The method of claim 15, further comprising the steps of:
- determining with a processing unit a circumferential meat surface profile of meat on the skewer, and
- determining the cutting profiles in order to cut the meat surface in one or more vertical cuts to a desired circumferential meat surface profile.

18. The method of claim 15, further comprising the step of rotating the skewer between each vertical cut over an angular distance, wherein the angular distance is dependent on the distance between the meat surface on the skewer and the vertical axis of rotation.

19. The method of claim 15, further comprising the steps of:
- determining a meat preparation recipe selected by an operator in a recipe selection device,
- automatically adjusting settings of the automatic meat cutting apparatus to grill and/or cut the meat according to the selected recipe, and/or
- indicate to the operator manual settings of the automatic meat cutting apparatus to for manual adjustment to grill and/or cut the meat according to the selected recipe.

20. The automatic meat cutting apparatus of claim 1, the step of using the processing unit to determine multiple vertical meat surface profiles comprising determining a 3D meat surface model.

21. Automatic meat cutting apparatus, comprising:
- a skewer holding system to hold a skewer with meat in a vertical position and to rotate the skewer about a vertical axis of rotation,
- a grill unit to grill meat on the skewer,
- a meat cutting device to cut meat from the skewer, and
- an actuator system to move the cutting device with respect to the skewer,
- a sensor device arranged to provide a sensor signal representative for a location of the meat on the skewer, and
- a processing unit to control the actuator system to move the cutting device to a desired cutting position on the basis of the sensor signal,
- wherein the meat cutting apparatus comprises a cutting unit comprising the sensor device and the cutting device,
- wherein the processing unit is configured to control the actuator system to move the cutting unit in an upwards movement along the meat surface to measure the distance between the sensor device and the meat surface, and wherein the processing unit is configured to control the actuator system to move the cutting unit in a downwards movement along the meat surface to cut meat from the skewer.

* * * * *